Jan. 27, 1970     W. J. MULDOON ET AL     3,491,969
MOTION SENSING SYSTEM HAVING A COHERENT
LIGHT BEAM AS A REFERENCE
Filed Nov. 25, 1966     5 Sheets-Sheet 1

William J. Muldoon,
Robert M. Zoot,
INVENTORS.

BY

*J. K. Haskell*

ATTORNEY.

Jan. 27, 1970  W. J. MULDOON ET AL  3,491,969
MOTION SENSING SYSTEM HAVING A COHERENT
LIGHT BEAM AS A REFERENCE
Filed Nov. 25, 1966                5 Sheets-Sheet 4

United States Patent Office 3,491,969
Patented Jan. 27, 1970

3,491,969
MOTION SENSING SYSTEM HAVING A COHERENT LIGHT BEAM AS A REFERENCE
William J. Muldoon, Palos Verdes Peninsula, and Robert M. Zoot, Thousand Oaks, Calif., assignors to Hughes Aircraft Company, Culver City, Calif., a corporation of Delaware
Filed Nov. 25, 1966, Ser. No. 597,142
Int. Cl. B64g 1/00; G01j 1/20; G01c 1/00
U.S. Cl. 244—1                                17 Claims

ABSTRACT OF THE DISCLOSURE

A motion sensing and control system utilizing a source of coherent light, photodetectors and attitude computing apparatus for determining and correcting the position of a moving body. A source of coherent light establishes a fixed reference from which the photosensing elements mounted at the moving body provide instant light information translatable into body motion geometry.

BACKGROUND OF THE INVENTION

This invention relates to guidance systems and more particularly to an optical system using a single coherent light beam for deriving change of position information for the variety of motions experienced by a moving body.

Moving bodies such as space satellites, borer-machines used in mining minerals, road laying and pipe laying equipment are subject to various changes in position. With regard to satellites and the problem of docking and rendezvous, inertial systems, radar systems, or optical systems have been used in the attempt to accomplish successful guidance for rendezvous and docking maneuvers. Inertial guidance systems rely upon sensing forces in relating the motion sensed to some predetermined reference such as a star or true north, et cetera. These ineritial systems contain gyroscopes which, due to mechanical stresses and tolerances, require compensation for frictional forces and are costly to build and subject to rapid deterioration by wear during operation. Optical systems for docking and maneuvering such as SATRAC, described in "Astronautics," June, 1961, employ non-coherent light as a pulsating beacon source for locating an object in space and in range measuring functions. However, the prior art optical systems employed are non-usable as multi-direction motion sensing systems, but rely upon an inertial system to provide information regarding rotational or lateral motions.

In sub-surface mining operations, heavy dust conditions prevail while the boring equipment, such as the type 426 Goodman borer, is in operation. Under these conditions the non-coherent light sources even though intense are ineffective as beacons due to dispersion and the inability to penetrate the dust. Similarly, where intense non-coherent light is used to illuminate the boring equipment and television cameras are used to observe motions of the equipment, TV camera blackouts may occur because of lack of penetration of heavy dust to permit camera visibility.

The present invention overcomes the problems of the inertial systems, beacon optical systems, and other non-coherent optical systems by kinematic derivation of motion changes, thereby eliminating the mechanical-frictional problems related to force (gyroscopic motion) sensing. Also, the use of intense coherent light in the heavy dust conditions of mining penetrates the dust barriers effectively and permits continuous derivation of changes in motion information under even the most severe dust conditions. It is therefore an object of the present invention to provide a system having a single coherent light source and sensing means for kinematically deriving positional information related to a moving object.

Another object of the present invention is to provide a unique arrangement of coherent light sensors to automatically derive a multiplicity of degrees of motion information experienced by a moving body.

A further object of the present invention is to provide a system utilizing a single polarized coherent light beam to derive a multiplicity of degrees of motion position information of a moving body.

Still another object of the present invention is to provide an optical system for precision guidance control of a moving body.

SUMMARY OF THE INVENTION

Briefly, the system of the present invention according to one embodiment employs a laser as a transmitting source of a coherent and narrow light beam, a receiver having optics and an arrangement of sensors to sense directional changes of the coheret light beam, and an attitude computer coupled to the sensors. The laser beam provides a predetermined reference axis for motion geometry from which all motions of the body where the receiver is located are derived. Within the receiver optical system are an objective lens, a beam splitter and two sets of light sensors. The light beam entering the objective lens is divided by the beam splitter, a portion of the light falling upon a first sensor located between the lens and the focal plane of the lens while a second portion of the light beam is reflected from the beam splitter to a second sensor located at the focal plane of the objective lens. As the body, where the receiver is located, moves horizontally, vertically, and about the yaw or pitch axes the direction in which the incident light beam strikes the lens determines the path and therefore the sensor impinging points of the light beam. Depending upon where the light beam strikes the sensors, a voltage (or current) is generated by the sensors. By combining the information from both sensors or either sensor alone the changes in position of the body relative to the initial beam position are derived in the attitude computed by simple arithmetic operations.

DESCRIPTION OF THE FIGURES

For a better understanding of the invention, together with other and further objectives thereof, reference is made to the following detailed description taken in conjunction with the accompanying drawings given by way of example in which like reference characters designate like reference parts throughout the figures and wherein.

DESCRIPTION OF ONE PREFERRED EMBODIMENT OF THE INVENTION

Figure 1:
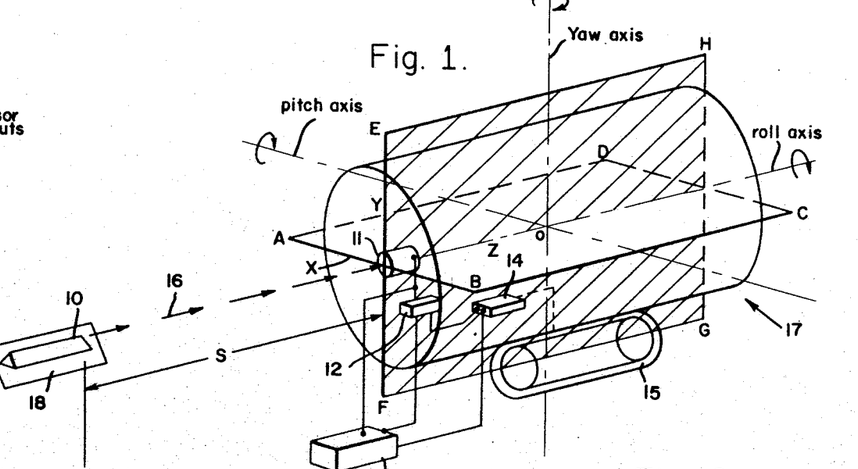
FIGURE 1 is a perspective view of a system embodying the present invention defining the various planes of motion and axes of motion.

In FIG. 1, there is shown a source 10 of intense coherent light, the light being shown by a beam 16 which is initially oriented along the roll axis of a moving body 17. A receiver 11 is located at the intersection of the horizontal plane (A, B, C, D) and the vertical plane (E, F, G, H), the intersection being shown as the roll axis. It is understood that the body 17 may move either clockwise or counter-clockwise about the roll axis and may move vertically or horizontally. Roll axis information is limited to a 180° sector in the present invention, provided that only a single coherent light beam is used. This limitation is discussed further subsequently in this specification of the preferred embodiment. The yaw and pitch axes are also illustrated to show that the body 17 may move angularly in yaw and pitch axis rotation. Changes in attitude and position of the moving body 17 after initial orientation directly effect a change in the orientation of the incident beam 16 relative to the reference axis of body 17, assuming that the coherent light source 10 is held stationary. The changes in direction of the incident beam 16 due to changes in attitude and position of the moving body 17 are sensed by the receiver 11 and the information is transferred to an attitude computer 12 which solves motion equations to precisely derive change in position and attitude information. The receiver 11 output which may also be coupled to a display device 13, which may be a cathode ray tube, for example. The output of attitude computer 12 may either be coupled to the display device 13 which indicates the magnitude and the direction of the attitude and position change, or may be coupled directly to drive correction apparatus 14. Information at the display 13 permits manual control of the moving body 17 to re-orient the body 17 along the reference axes. A drive correction apparatus 14 is shown coupled to a drive 15, which could be a servo type or mechanical system, to automatically or manually drive the body 17 in the appropriate direction to correct the orientation of the body 17.

Figure 2:
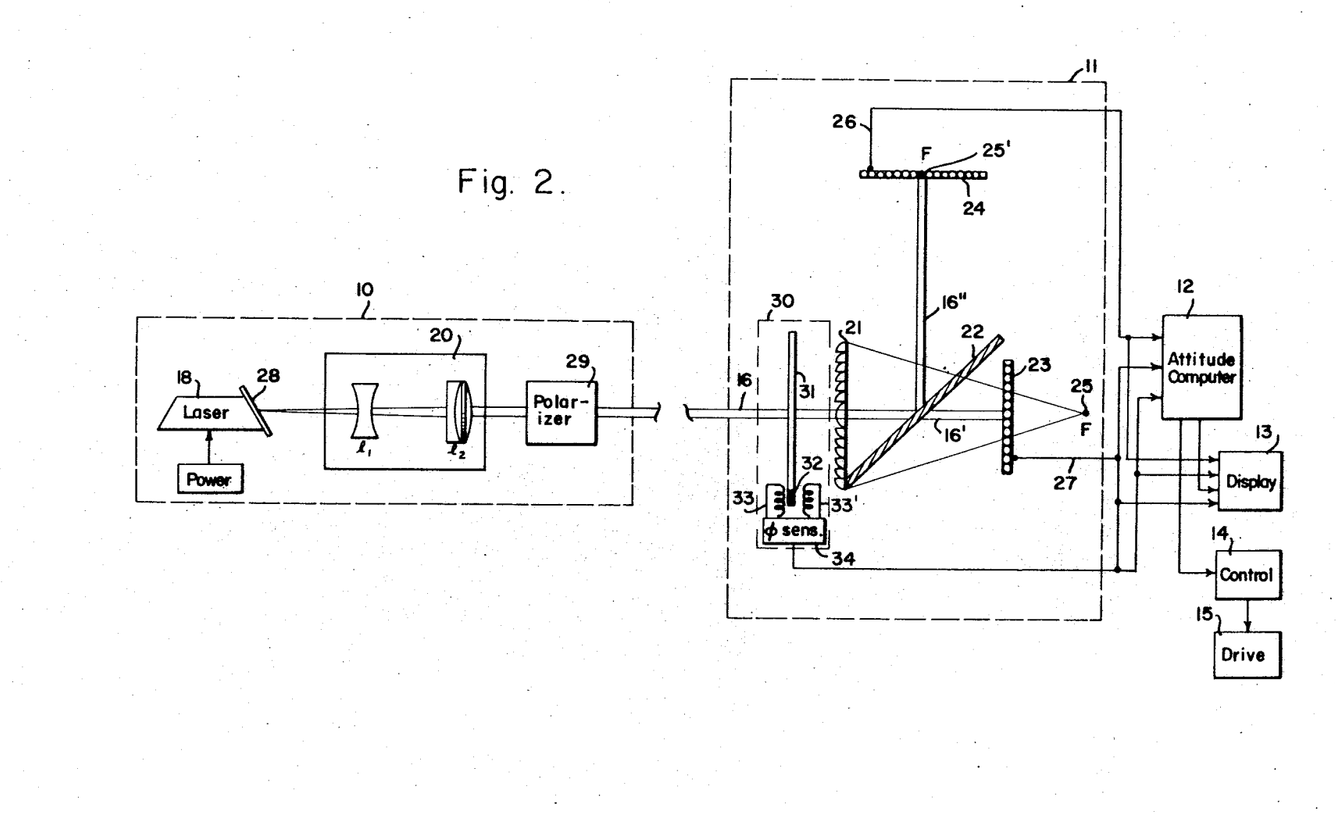
FIG. 2 is a functional electro-mechanical schematic illustrating the system of the present invention.

Referring now to FIG. 2 an embodiment of the present invention is shown comprising a means for transmitting coherent light in the form of transmitter 10 and a means for receiving coherent light in the form of receiver 11. Included within the transmitter 10 there is shown a laser 18 emitting a narrow light beam which is incident upon a collimator 20. Lasers or optical masers are well known to those skilled in the art of coherent light sources, and are described in the textbook "Lasers" by Bela A. Lengyel, John Wiley & Sons, Inc., 1962. Collimator 20 is illustrated as the Galilean type, however, it is understood that other collimator types, such as the astronomical telescope collimator, may also be used. It is the function of the collimator, as is well known to those skilled in the art, to make the light rays parallel from light source and to adjust the line of sight of the light beam. For a multimode ($TEM_{mm}$) laser, the beam divergence after collimation is approximately 50 microradians. Under such conditions, the laser beam diameter is 2 inches at a range (distance) of 1700 feet. Because of such beam spread, accuracy of measurement of translation ($x$, $y$) motion is equal to the laser beam radius. Accuracy increases at shorter ranges due to less divergence closer to the source. The laser light beam 16 enters the receiver 11 through an objective lens 21, herein shown as a Fresnel type of lens. The light beam after passing through the objective lens 21 is split into two portions 16' and 16" by a beam splitter 22. According to some embodiments of the present invention, an objective lens 21 to focus the laser light beam 16 on a sensor is not necessary for the operation of receiver 11. Where no objective lens 21 is used, the laser light beam 16 enters an aperture in the receiver 11 and is directed straight through to the beam splitter 22. The first beam portion 16' passes through the beam splitter 22 and is incident upon a lateral sensor array 23 located between the objective lens 21 and focal point 25 of the objective lens 2. Beam portion 16" is reflected from the beam splitter 22 and is incident upon an angle sensor array 24 which may be located at the focal plane of lens 21, for example. By positioning one sensor array of the two sensor arrays 23 and 24 at a greater distance from the beam splitter 22 than the other sensor the differential displacements between the two sensor arrays 23 and 24 permit calculation of separate displacement and rotational components of motion. Although the lateral sensor array 23 is shown to be closer to the beam splitter 22 than the angle sensor array 24 it is understood that either may be closer to the beam splitter 22 than the other. In other words, the relative distances from beam splitter 22 of the angle sensor array 24 and the lateral sensor array 23 may be interchanged.

The sensor arrays 23 and 24 are comprised of a series of sensor elements well known to those skilled in the art such as photovoltaic silicon detectors, vacuum photodiodes, photomultipliers, and radiation tracking transducers. The selection of the type of sensor is dependent upon the type of application involved and upon the distance between the coherent light source and the receiver 11. Silicon detectors are well known in the art and are most desirable where system requirements include compactness and ruggedness and where low operating voltages are needed. Photomultipliers are used of high sensitivity because they possess high internal gain and are shot-noise limited devices. A matrix array of sensors is oriented so that when the incident coherent light beam strikes one of the sensors a voltage from the one struck by the light is produced. Orientation of sensors is further discussed later in the specification. In FIG. 2 there is also shown an embodiment of the prevent invention utilizing polarized coherent light to assist in the derivation of roll axis motion. The output end of a laser 18 contains a Brewster window 28. If a laser source is used, the Brewster window 28 polarizes the beam from laser 18. If a coherent light source other than laser 28 is used, then a polarizer 29 is inserted at the output of the collimator 20. Positioned at receiver 11 there is located a rotating polarizing screen 31 having a metal piece 32 affixed thereto and having its axis of rotation centered about the roll axis of the receiver 11. As the rotating polarizing screen 31 turns the metal piece 32 passes through a pair of coils 33 and 33' which by induction generate a voltage as the metal portion 32 passes between the coils 33 and 33'. By the turning of the rotating polarizing screen 31 metal piece 32 at a constant speed a marker pulse reference is established to assist the derivation of the displacement experienced by the rotating body 17 and consequently the receiver 11 about the roll axis. A further discussion of development of roll axis angle information is discussed later as the specification progresses. A phase sensing apparatus 34 permits phase sensing such that the roll axis position of body 17 is known at any instant. By precalibration, when the output of a sensor, either the lateral sensor array 23 or the angle sensor array 24, reaches a maximum, the polarization axis of the polarizing screen 31 is parallel to the polarized plane of the beam 16.

Figure 3:
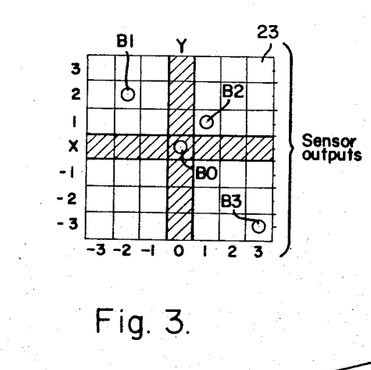
FIG. 3 is a plan view of a matrix sensor showing the incident point of a coherent light beam upon the sensors.

Turning now to FIG. 3, there is shown a plan view of a matrix sensor 23 showing a series of incident beam points $B_0$, $B_1$, $B_2$, and $B_3$. The location of the incident beam point determines the output generated by a particular light sensor in the matrix 23 and thereby produces sensor position information, here shown as sensor X–Y axis information related to a change in motion of the moving body 17. As an example, an incident light beam upon the sensor at point $B_1$ generates X–Y coordinate voltages indicating that the beam position is located at the sensor coordinates $X=-2$ and $Y=+2$. Similarly, the sensor X–Y coordinate voltage generated for incident beam point $B_3$ establishes that $B_3$ is located at the sensor coordinates $X=+3$ and $Y=-3$. If the effective width of each sensor in the matrix array illustrated is one-quarter (.25) inch, then the beam for beam point $B_1$ has moved at least .5 inch left on the X-axis and at least .5 inch up on the Y-axis. Thus the effective size of the individual sensor in the matrix will determine the lateral accuracy of the sensor system. In a matrix arrangement the smaller the sensor and the narrower the beam the greater is the system motion measuring accuracy for both angular and lateral motions. Other sensors, such as the radiation tracking transducer sensor (RTT) generate DC voltages the magnitude of which is indicative of the coordinate position where the light beam strikes the sensor. The RTT functions like an array of sensors, except that it is a single sensor. It is understood that the sensor 23 may be a single sensor which produces the coordinate information described above or may be a set of sensors in a 7 x 7 or other matrix arrangement. The type, number and size of sensors are chosen on the basis of the physical limitations and the accuracies desired in a particular motion sensing system. The examples shown here are equally applicable to both lateral sensor 23 and the angle sensing sensor 24 except that for the angle sensor 24 the coordinate voltages generated for the incident beam points are translated into angle information rather than x–y coordinate information. This matter is more thoroughly described in this specification in the discussion with relation to FIGS. 4(a) and 4(b).

Figure 4A:
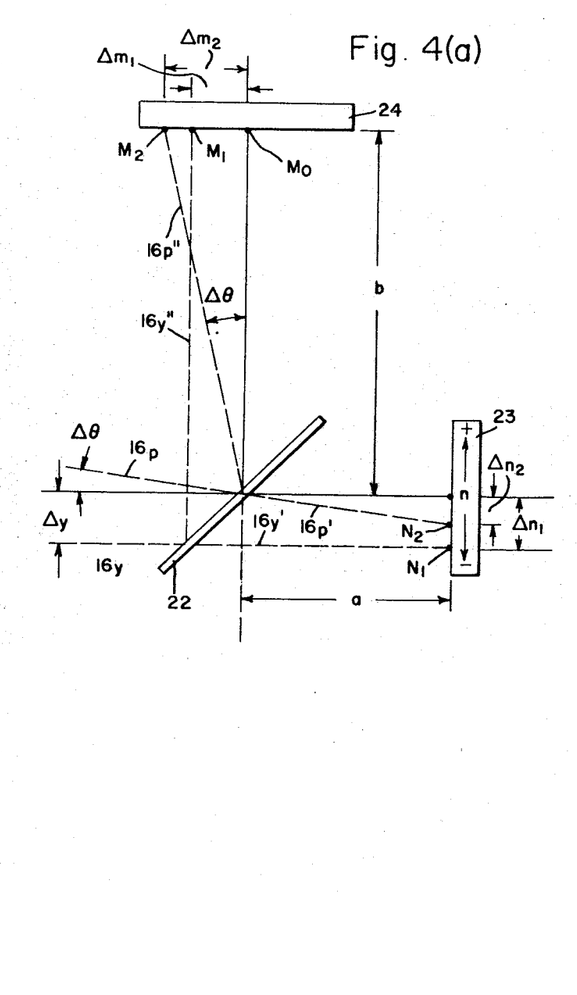
FIG. 4(a) illustrates the information geometry of the beam sensing system for either motion about the pitch axis or within the vertical plane.

Turning now to FIG. 4(a) there is shown the sensor system of the present invention wherein the angle sensor 24 and the lateral sensor 23 are illustrated. An objective lens is not shown here but may be used as part of the system. As has been mentioned previously, the angle sensor 24 is placed at a greater distance from beam splitter 22 than the distance of the lateral sensor 23 to develop a constant ratio (constant of proportionality) so that angular and translational motions are distinguishable. A beam 16Y for rexemplifying pure lateral translation on the vertical (Y) axis plane strikes the beam splitter 22 and a portion 16Y'' of the beam is directed toward and strikes angle sensor 24 at point M1 while the other beam portion 16Y' proceeds toward and strikes the Y or lateral (translational) sensor 23 at point $N_1$. If only translational motion exists on the Y-axis, then $\Delta m_1 = \Delta n_1$ and $\Delta Y = \Delta n_1$ (assuming that beam splitter 22 is disposed at the same angle to each of the beam receiving surfaces of sensors 23 and 24). The value of $\Delta n$ has a direct correlation to the linear distance moved. A direct correlation exists if the body moves ⅛ inch and produces a beam movement ⅛ inch on the sensors 23 and 24.

The beam 16P for exemplifying pure angular motion about the pitch axis, visualizing the pitch axis being perpendicular to and going through the plane of FIG. 4(a) at the incident point on the beam splitter 22 of the reference beam 16, is reflected from the beam splitter prism 22 wherein a first portion 16P'' strikes the angle sensor 24 at a point $M_2$ while the other beam portion 16P' proceeds through the beam splitter 22 and strikes the lateral sensor 23 at the point $N_2$. The distance $\Delta m_2$ is directly proportional to the angle $\Delta \theta$. Similarly, the distance $\Delta n_2$ is proportional to the angle $\Delta \theta$. A constant of proportionality between $\Delta m_2$ and $\Delta n_2$ is determined by the ratio of the distance $b$ to the distance $a$. Distance $a$ being defined as the linear distance from a point on the beam splitter 22 to the face of the lateral sensor 23; the distance $b$ is defined as the linear distance from the aforementioned point on the beam splitter 22 to the face of the angular sensor 24. In the system of the present invention illustrated here, the distance $a$ is smaller than distance $b$. The aforementioned point on the beam splitter 22 is also the intersection of the established reference beam 16. Thus, if the ratio of $b/a=4$, then 4 times $\Delta m_2$ equal $\Delta n_2$. For the system shown to indicate pure pitch axis information the value of $\Delta n_2$ times the constant of proportionality will equal exactly $\Delta m_2$. If both pitch axis rotation and lateral motion on the Y-axis occurs, then the values of the constant of proportionality $(b/a)$ times $\Delta n_2$ does not equal $\Delta m_2$. This situation is more clearly understood by reference to FIG. 4(b).

Figure 4B:
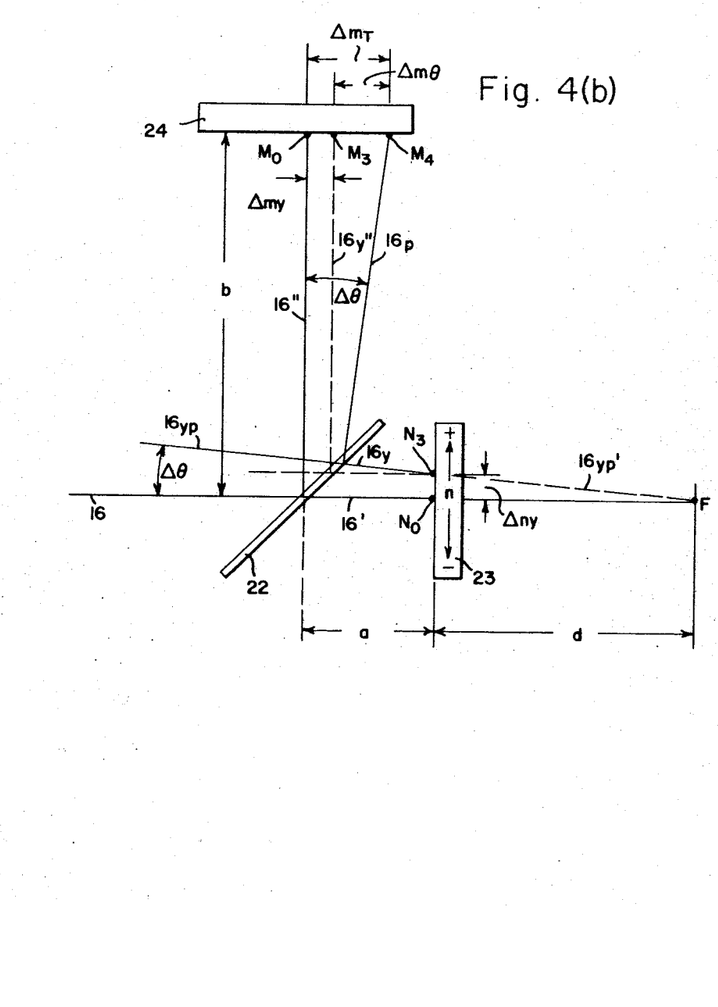
FIG. 4(b) illustrates the information geometry of the sensor locations related to the combination of pitch axis motion together with motion in the vertical plane.

There is shown in FIG. 4(b) an illustration of the situation where both pitch axis rotation and lateral motion on Y-axis occurs and an objective lens is added to the system. The sensors 23 and 24, as well as the beam splitter 22 and the reference beam 16, are shown in the arrangement previously described with respect to FIG. 4(a). When the body 17 moves in both elevation and rotates about the pitch axis the new beam position is shown as 16YP. At the beam splitter 22 the first portion (16Y) of the beam 16YP passes through to the sensor 23 and is incident at point $N_3$. The second portion (16P) of the beam 16YP is reflected toward the angle sensor 24 and strikes the angle sensor 24 at point $M_4$. The distances $a$ and $b$ maintain the same relationship as described with regard to FIG. 4(a). The changing angle $\Delta \theta$ (or $\theta$) representing rotation about the pitch axis is shown between the reference beam 16 and the beam 16YP as well as between the reference beam 16'' and the reflected pitch beam 16P. The mathematical relationships regarding the geometry illustrated are as follows:

(1) $$\Delta m_T = \Delta m_Y + \Delta m_\theta$$

(2) $$\Delta n_Y = \Delta m_Y$$

(3) $$\left(\frac{b}{a}\right)(\Delta n_Y) = \Delta m_T$$

(4) $$\tan \theta = \frac{\Delta n_Y}{d}$$

(5) $$\tan \theta = \frac{\Delta m_T - \Delta m_\theta}{d}$$

(6) $$\theta \text{ (pitch angle)} \approx \frac{\frac{b}{a}\Delta m_Y - \Delta m_\theta}{d}$$

(7) $$Y \approx \Delta n_Y$$

The above equations define the information geometry of the system illustrated for the motion along Y-axis and rotation about the pitch axis. Similar equations expressed later also define motions about the yaw axis and the horizontal axis (X-axis) motions. The distance $d$ is known and is defined as the distance between the face of lateral sensor 23 and the focal point F of the objective lens 21 of this system embodiment. It is important that the logic used in this system be understood and is expressed by the following three statements:

(I) Only body motion along the Y-axis exists if $$\Delta n_Y = \Delta m_T = \Delta m_Y$$

(II) Only rotation about the pitch axis exists if $$\left(\frac{b}{a}\right)(\Delta n_Y) = \Delta m_T = \Delta m_\theta$$

(III) Both rotation about the pitch axis and lateral movement along the Y-axis exists if $$\left(\frac{b}{a}\right)(\Delta n_Y)$$

does not equal $\Delta m_T$ and $\Delta n_Y$ does not equal $\Delta m_T$.

In the situation illustrated by and referring to statement (III), the displacement $\Delta n_Y$ is equal to $\Delta m_Y$ but is not equal to $\Delta m_T$. Therefore, it is stated that there is motion additional to motion along the Y-axis. Similarly, $\Delta n_Y$ does not equal $\Delta m_T$ indicating that there is motion in addition to pure translation on the Y-axis. By continuously solving the above equations being implemented by the logic stated, the dual motion about the pitch axis and along the Y-axis permits extraction of information showing the extent of the motion with relation to the aforesaid axes.

As previously mentioned in the discussions related to FIG. 3 incident beam points $N_3$ and $M_4$ result in a generation of coordinate voltages by the sensors 23 and 24 to establish beam positions. Substituting these voltages for the values of $\Delta n_Y$, $\Delta m_T$, $\Delta m_Y$, $\Delta m_\theta$, equations are immediately soluble by conventional sum and difference circuitry, and the Y-axis (Y) and pitch axis ($\theta$) values are thereby determined.

Figure 5:
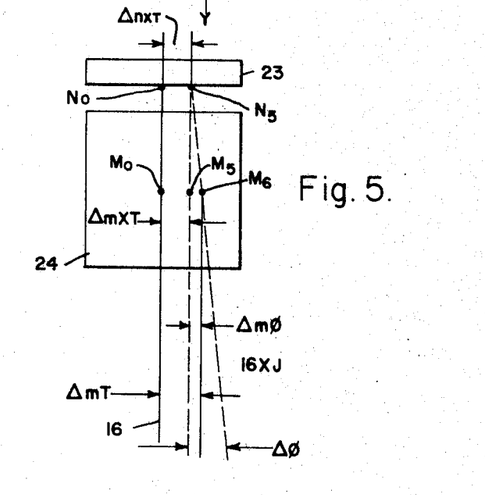
FIG. 5 illustrates the information geometry for deriving horizontal and yaw axis motions.

Referring now to FIG. 5, there is illustrated a top view of the motion sensing system of the present invention to develop motion equations for the combination horizontal translational motion (X-axis) and the angular motion ($\phi$) about the yaw-axis. Orientation of the sensors 23 and 24 remains as illustrated in the previous FIGS. 4(a) and 4(b), and for clarity and drawing simplification the beam splitter 22 is not shown, but is assumed to exist below the angular sensor 24. The $a$ and $b$ distances separating the sensors remain herein as well as the distance $d$ as previously illustrated. Initially the reference beam 16 after being divided by the beam divider 22 strikes the angular sensor 24 at point $M_0$ and the lateral sensor 23 at the point $N_0$. When the moving body 17 moves in the horizontal plane and about the yaw axis, the beam 16XJ represents such change in relative position between the initial position of the reference beam and the new orientation of the reference beam incident to the sensors 23 and 24. Incident point $N_5$ represents the distance change of horizontal motion $\Delta nXT$. If only horizontal motion existed then the beam 16XJ would be divided such that the X-axis motion beam component strikes angular sensor 24 at incident point $M_5$. But since both horizontal and yaw axis motion exists, the change in the yaw angle ($\Delta\phi$) causes the beam to strike the angle sensor 24 at point $M_6$. The yaw angle change being proportional to the distance between $M_5$ and $M_6$.

The equations developed for horizontal and yaw motion, which are similar to those developed for X-axis and pitch motions, are:

(1) $\quad \Delta mT = \Delta mXT + \Delta m\phi$ (2) $\quad \Delta nXT = \Delta mXT$ (3) $\quad \left(\dfrac{b}{a}\right)(\Delta nXT) = \Delta mT$ (4) $\quad \tan \phi = \dfrac{\Delta nXT}{d} = \dfrac{\Delta mT - \Delta m\phi}{d}$ (5) $\quad \phi \text{ (yaw angle)} \approx \dfrac{b/a(\Delta mYT - \Delta m\phi)}{d}$ (6) $\quad X \approx \Delta nXT$ The logic for development of horizontal and yaw axis motions illustrated here are also similar to that developed relevant to FIG. 4(b), the logic being:

(IV) Only body motion along the X-axis exists if $\Delta mT = \Delta mXT = \Delta nXT$.

(V) Only rotation about the yaw axis exists if $(b/a)\Delta nXT = \Delta mT = \Delta m\phi$.

(VI) Both rotation about the yaw axis and along the X-axis exists if $b/a\Delta nXT$ does not equal $\Delta mXT$ and $\Delta mXT$ does not equal $\Delta nXT$.

Figure 6A:
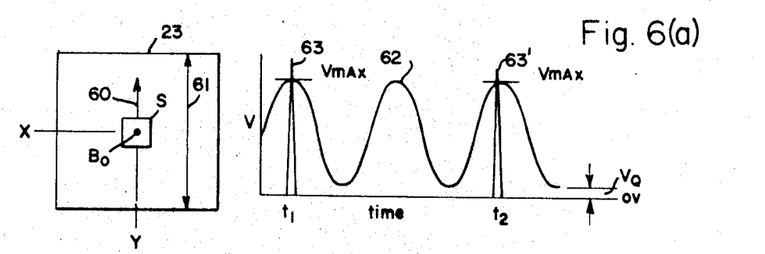
FIGS. 6(a), 6(b) and 6(c) illustrate the development of roll angle information as depicted on an oscilloscope display.
Figure 6B:
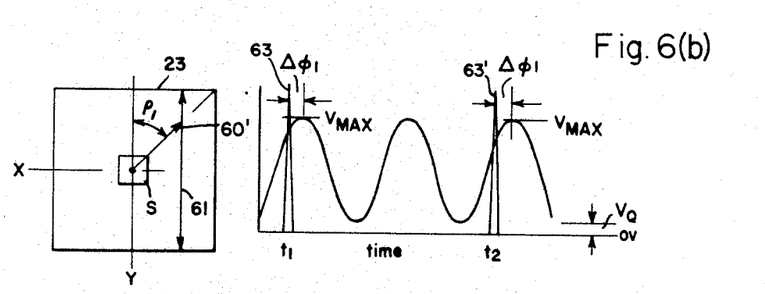
Figure 6C:
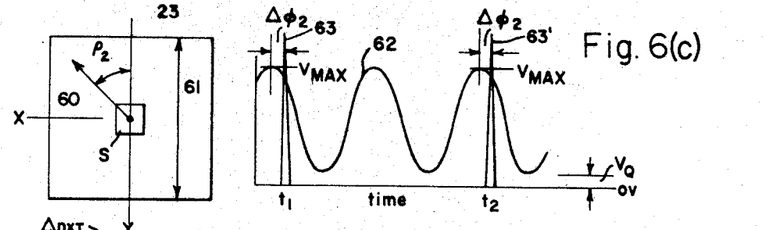

In the series of FIGS. 6(a), 6(b), and 6(c) are illustrated the developed roll angle information from the incident polarized light beam upon a sensor. In FIG. 6(a) there is shown the lateral motion sensor matrix 23, having a typical sensor S upon which is the incident beam point $B_0$. Initially a polarization plane 61 is aligned as shown by a directional arrow 60. An output signal illustrated by waveform 62 from the sensor S, initially, is at a maximum ($V_{MAX}$) and this maximum is also precalibrated to be coincident with the generation of the marker pulses 63 and 63'. Sensor output signals may be either DC or AC, and are illustrated here as the filtered DC output signal 62. As mentioned previously the marker pulses, 63, 63', etc. are generated by rotation of the polarizing screen 31 at the receiver 11, and occur every 360° rotation of the polarizing screen 31. The voltage $V_Q$ is the quiescent level of the sensor.

FIG. 6(b) illustrates a clockwise rotation about the roll axis to generate the roll angle $\rho_1$. When the body rotates through angle $\rho_1$, the change in phase $\Delta\phi_1$ occurs, such that a time measurement from the marker pulse 63 to the position of $V_{MAX}$ is a direct indication of the roll angle $\rho_1$. Similarly, FIG. 6(c) illustrates counter-clockwise roll through the angle $\rho_2$, and the extent of roll is measured by the time $\Delta\phi_2$. For each sensor, roll is measurable only up to 180° rotation since a rotation through an angle of more than 180° is indistinguishable from rotation through an angle 180° less than the angle in question. This 180° ambiguity may be removed by a second light source as a reference ot distinguish the top from the bottom of the moving body 17, where the receiver 11 is located. However, where a body is limited in roll, such as where it moves on a surface that limits the extent of roll to 180° or less, the roll accuracy of the invention in the present system is sufficient. Therefore, roll information from the single polarized beam is limited to ±90 degrees from a predetermined position.

Figure 7:
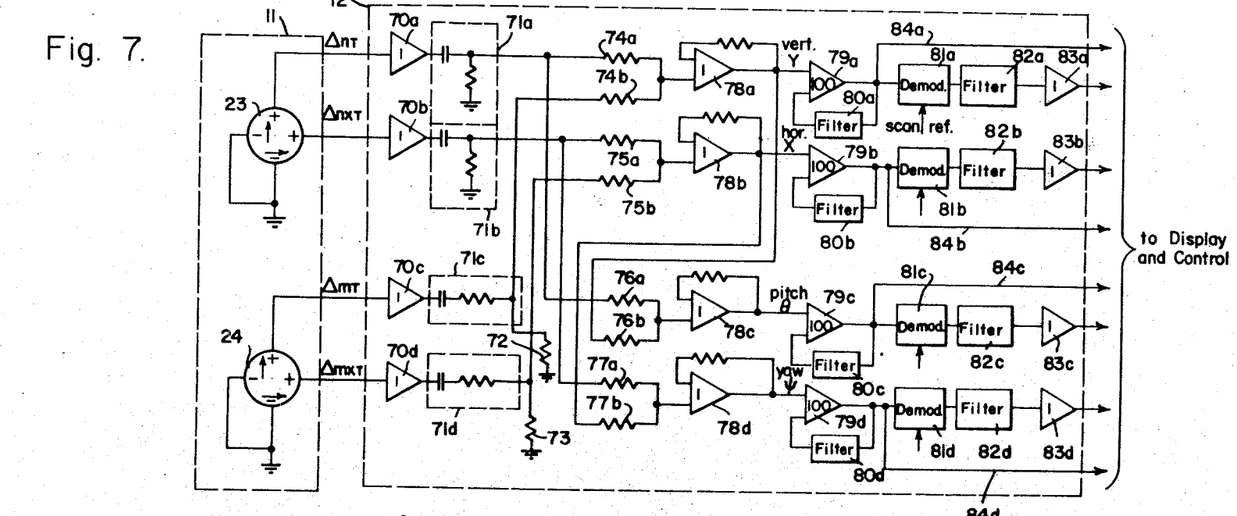
FIG. 7 is a schematic and functional diagram showing the development of vertical, horizontal, pitch and yaw output signals from the sensors.

Turning now to FIG. 7 there is illustrated the electronics circuitry of a system embodiment of the present invention for automatically developing body orientation information suitable for display and control. The lateral sensor 23 illustrated is of the displacement (radiation tracking transducer) type having the outputs $\Delta nT$ and $\Delta nXT$. These output signals are applied to identical channel circuitry for developing separate electrical signals which are a measurement of the vertical and horizontal displacements respectively. Similarly, the angular sensor 24 is of the displacement type and develops an output signal $\Delta mT$ and an output signal $\Delta mXT$. The respective signals $\Delta mT$ and $\Delta mXT$ are applied to the respective channel circuitry for developing pitch and yaw electrical output signals respectively. The outputs of each sensor are coupled respectively to the amplifiers 70a, 70b, 70c and 70d which are conventional amplifiers and may be of the emitter follower type. At the output of each amplifier 70a through 70d there are shown the isolation circuits 71a, 71b, 71c and 71d which establish electrical isolation between the respective sensor and the channel circuitry due to the quiescent voltage ($V_Q$) characteristics of the sensors 23 and 24. A series of resistors 74a, 74b, 75a, 75b, 76a, 76b, and 77a, 77b are provided as current summing resistors which perform the function previously described with regard to the beam displacement on the sensors. In each of the respective pitch and yaw channel circuitry there is shown the resistors 72 and 73 coupled to the isolation resistors 71c and 71d for establishing the constant of proportionality previously described. Coupled to each corresponding summing circuit are respective summing amplifiers 78a, 78b, 78c and 78d which may be of the conventional operational amplifier type for producing an output signal proportional to the sum of the two input currents. Summing amplifiers 78a through 78d in each channel are coupled to a display and controls as the situation demands. Where, however, the system includes the necessity for roll axis rotation information development, the outputs of the summing amplifiers 78a through 78d are applied to the demodulators 81a, 81b, 81c and 81d. The bandpass filters 80a, 80b, 80c and 80d are coupled to the demodulators 81a through 81d which filter noise from the modulated sensor output signals and each demodulator 81a through 81d has a pulsed DC output. These demodulators are of a conventional type and may be of the double diode bridge type or double transistor type; the main function of demodulators 81a through 81d being to permit electronic access to the fundamental of the modulated waveform. The pulsed DC output of demodulators 81a through 81d is proportional to the input and a reference pulse. The reference pulses for each demodulator are obtained from the roll beam sensor channel, shown in FIG. 8. Coupled to each demodulator are ripple filters 82a, 82b, 82c and 82d. Each ripple filter is coupled to an amplifier 83a, 83b, 83c and 83d. Amplifiers 83a through 83d are conventional and have sufficient gain to permit visual display on an oscilloscope or to drive a servo system to re-orient the moving body.

Figure 8:
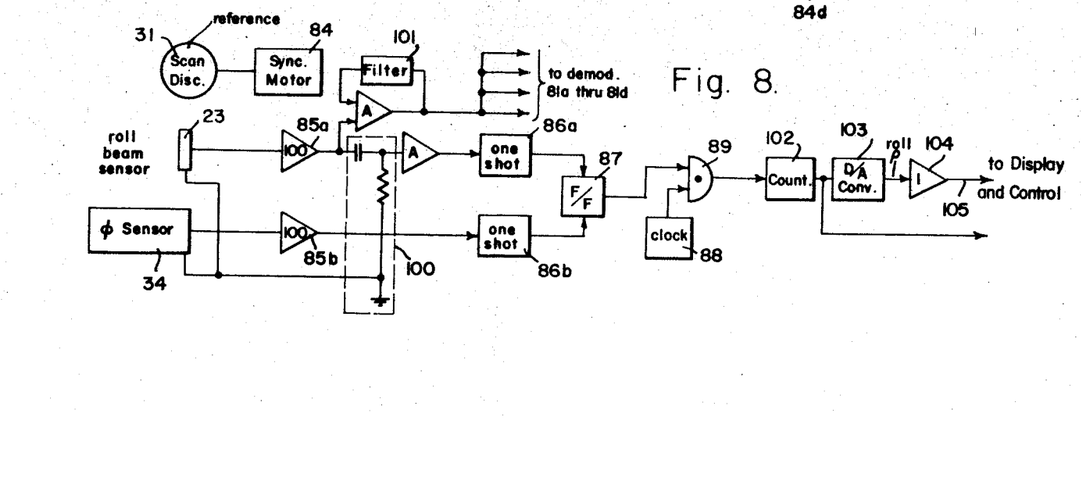
FIG. 8 is a functional schematic diagram illustrating the development or roll angle information.

In FIG. 8 there is shown the channel of the electronics of the attitude computer 12 used to develop roll axis displacement information. The outputs of a scanning disc marker pulse detector 34 and lateral sensor 23 are applied respectively to high gain amplifiers 85b and 85a. In the circuit of the lateral sensor 23 is an isolation circuit 100 to isolate the remainder of the circuitry from the quiescent state of the sensor. Coupled to the output of high gain amplifier 85a there is shown an amplifier including a bandpass filter 101 which develops the demodulated pulses used in developing pitch, yaw and X and Y axis displacement information. The one shot multivibrators 86a and 86b coupled to amplifiers 85a and 85b, respectively are conventional and produce outputs to set and reset a flip-flop 87; and the flip-flop 87 has an output coupled to an AND gate 89. Also coupled to the AND gate 89 is a clock pulse generator 88. When the AND gate 89 has an output counter 102 determines the time interval of the AND gate 89 and establishes the extent of roll axis displacement of body 17 as previously discussed in relationship to FIGS. 6(a), 6(b) and 6(c). The output of counter 102 is digital in form and is converted by a digital-to-analog converter 103 to produce an analog roll voltage. The digital analog converter 103 is not necessary when the digital information developed is immediately useful for digital computer calculations, but for display and servo operations the analog form of roll axis displacement information is more desirable. There is also shown in FIG. 8 a drive for the polaroid scanning disc 31. A synchronous motor 84 drives the scanning disc 31 so that it revolves at a constant speed; and a conventional synchronous motor is sufficient for this purpose.

Figure 9:
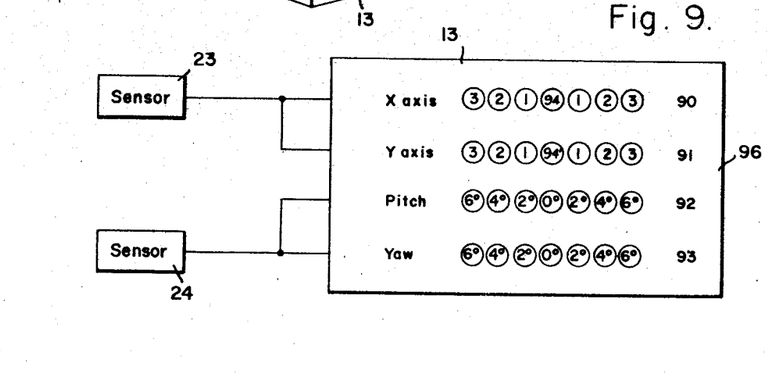
FIG. 9 is a plan view and functional diagram of a typical display for the body orientation information derived by the sensors.

In FIG. 9 there is shown an example of display device 13 as shown in FIG. 1 lateral sensor 23 and angular sensor 24 coupled thereto. The display device is comprised of a panel 96 upon which are mounted designated lamps in rows 90, 91, 92 and 93. Each lamp is coupled to the electrical output of the respective sensor 23 and 24. When the respective sensor 23 or 24 has an electrical output signal the appropriate lamp in the appropriate row lights to give an indication of the orientation of the moving body 17. As an example, assume that the lateral sensor 23 is a 7 x 7 matrix of sensors having a center sensor (B0, FIG. 3) coupled to lamps 94 and 94', then so long as the light beam is incident upon the center sensor, the lamps 94 and 94' are lit. Similiarly, when the incident beam strikes the sensor in the matrix coupled to the "1" lamp on the X-axis, the "1" lamp lights. The display device shown here is a simple form of a display device useable with the present invention. However, other display devices such as cathode ray tubes and storage tubes may also be used.

What is claimed is:

1. A receiver located at a moving body for developing lateral and angular body motion information relative to a predetermined reference point established by a stabilized source of single beam of coherent light, comprising:

beam splitting means positioned in the path of said single beam of coherent light for dividing said single beam of light into a first beam and a second beam, said first beam being a continuation of said single beam, and said second beam being a reflected beam;

first light sensor means positioned at a fixed distance a from said beam spliting means in the path of said first beam for sensing the incident point of said first beam and generating an electrical output signal indicative of the beam incident point on the sensor; and second light sensor means positioned at a fixed distance b from said beam splitter, distance b being greater than said distance a to a sense the incident point of said second beam from said beam splitter and generating an electrical output signal indicative of the beam incident point on said second sensor.

2. In the receiver according to claim 1, wherein said receiver includes in combination a focusing lens having a predetermined focal length and positioned in the path of said single beam for directing said single beam in the direction of said beam splitting means.

3. In the receiver according to claim 2, wherein said first sensor means is positoned at a fixed distance d from the focal point of and within said focal length, and said second sensor means is positioned in the focal plane of the combination of said beam splitting means and said focusing lens, the position of the second sensor, being established to permit focusing of the second beam at a reference point when lateral and angular motion of said body exists and deviating from said reference point only when said body motion changes in either angular or transverse orientation relative to said reference.

4. A system for automatically deriving geometric orientation information concerning a moving body, the moving body being initially oriented along a stabilized reference established by a narrow beam of intense coherent light, comprising:

a receiver located at said moving body and positioned in the path of said narrow beam and adapted to receive said narrow beam for converting incident light into electrical signals containing body orientation information, said receiver including a beam splitter positioned in the path of said narrow beam for dividing said reference beam into a first light beam and a second light beam, said first beam being a continuation of said reference beam and said second beam being a reflected beam, said receiver also including first and second light sensors responsive to the respective first and second light beam for generating electrical output signals based upon the position of the respective light beam incident upon the respective sensor, said second sensor being positioned at a predetermined and greater distance from said beam splitter than said first sensor; and attitude computer means adapted to receive said electrical output signals from said first and second light sensors and responsive thereto for computing the geometric orientation of said body, said attitude computer means including vertical and horizontal channels coupled to said first sensor for developing electrical output signals corresponding to the respective displacement of said body, and also including identical pitch and yaw channels, coupled to said second sensor means and to said vertical and horizontal channels, for developing electrical output signals corresponding to the respective pitch and yaw displacement of said body.

5. A system for automatically controlling the orientation of a moving body about a predetermined reference, comprising:

a source of an intense coherent light beam, said source being positioned at a fixed point relative to a moving body and establishing a fixed reference;

a receiver located at said moving body and positioned in the path of said narrow beam and adapted to receive said narrow beam for converting incident light into electrical signals containing body orienducing an electrical signal when either angular or transverse motion of said body occurs about said first, second or third axes, said first sensor means producing an electrical signal when angular motion of said body occurs about said second or third axes;

computing means responsive to the electrical signals generated by said first and second sensor means for computing direction and attitude correction signals; and means for changing the direction and attitude of said body in accordance with said correction signals.

References Cited

UNITED STATES PATENTS 3,360,655  12/1967  McKeown __________ 260—225

FERGUS S. MIDDLETON, Primary Examiner

U.S. Cl. X.R.

33—1; 73—178; 250—203; 356—147

PO-1050
(5/69)

UNITED STATES PATENT OFFICE
CERTIFICATE OF CORRECTION

Patent No. 3,491,969          Dated   January 27, 1970

Inventor(s)   W. J. Muldoon et al

It is certified that error appears in the above-identified patent and that said Letters Patent are hereby corrected as shown below:

Col. 1, line 40, "ineritial" should be --inertial--;
        line 69, "penertates" should be --penetrates--.
Col. 2, line 21, "coheret" should be --coherent--.
Col. 4, line 7,   "2" should be --21--;
        line 33, "of" should be --for--.
Col. 5, line 42, delete "for r";
        line 55, after "16P" delete "for".
Col. 6, line 1,   after "times", "$\Delta m_2$ equal $\Delta n_2$" should be
                  --$\Delta n_2$ equals $\Delta m_2$--.
Col. 7, line 44, "$\Delta mT = \Delta mXT + \Delta m\phi$" should be --$\Delta mT = mXT + \Delta m\phi$--
        line 54, "$\phi$ (yaw angle) $\approx \frac{b/a(\Delta mYT - \Delta m\phi)}{d}$ v should be                 --$\phi$ (yaw angle) $\approx \frac{b/a(\Delta mXT - \Delta m\phi)}{d}$ --;

line 69, "developed" should be --development--.
Col. 8, line 23, "ot" should be --to--.
Col. 9, line 8,   after "demodulator" insert --81a through 81d--;
        line 48, after "FIG. 1", insert --having--.
Col. 10, line 5, "spliting" should be --splitting--;
         line 12, after "to" delete "a";
         line 22, "positoned" should be --positioned--.

SIGNED AND
SEALED
AUG 25 1970

(SEAL)
Attest:

Edward M. Fletcher, Jr.
Attesting Officer

WILLIAM E. SCHUYLER, JR.
Commissioner of Patents